(12) United States Patent
Baldi et al.

(10) Patent No.: US 10,642,739 B2
(45) Date of Patent: May 5, 2020

(54) DISTRIBUTED COORDINATION OF CACHING AND PROCESSING BY NETWORKING DEVICES

(71) Applicant: Cisco Technology, Inc., San Jose, CA (US)

(72) Inventors: Mario Baldi, Brooklyn, NY (US); Amedeo Sapio, Naples (IT); Fulvio Giovanni Ottavio Risso, Cuneo (IT); Narendra Anand, College Station, TX (US); Antonio Nucci, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 15/700,453

(22) Filed: Sep. 11, 2017

(65) Prior Publication Data

US 2019/0079869 A1 Mar. 14, 2019

(51) Int. Cl.
*G06F 12/0817* (2016.01)
*H04L 29/08* (2006.01)

(52) U.S. Cl.
CPC ...... *G06F 12/0817* (2013.01); *H04L 67/2852* (2013.01); *G06F 2212/284* (2013.01)

(58) Field of Classification Search
CPC .......... G06F 12/0817; G06F 2212/284; H04L 67/2852; H04L 47/125; H04L 45/24; H04L 41/0813; H04L 41/5054; H04L 43/0817; H04L 47/6225; H04L 67/1008; H04L 45/7453; H04L 45/00; H04L 45/16; H04L 45/50; H04L 45/745; H04L 47/10; H04L 47/15; H04L 9/0643
See application file for complete search history.

(56) References Cited

U.S. PATENT DOCUMENTS

| | | | |
|---|---|---|---|
| 4,633,387 A | 12/1986 | Hartung et al. | |
| 6,351,775 B1 | 2/2002 | Yu | |
| 6,788,692 B1 | 9/2004 | Boudreau et al. | |
| 7,640,262 B1 * | 12/2009 | Beaverson | G06F 16/2246 |
| 9,571,400 B1 * | 2/2017 | Mandal | H04L 47/125 |
| 9,614,752 B2 * | 4/2017 | Ramesh | H04L 45/24 |

(Continued)

OTHER PUBLICATIONS

V. Sekar, M. K. Reiter, W. Willinger, H. Zhang, R. R. Kompella, and D. G. Andersen, "csamp: A system for network-wide flow monitoring." in NSDI, vol. 8, 2008, pp. 233-246.

(Continued)

*Primary Examiner* — Wutchung Chu
(74) *Attorney, Agent, or Firm* — Behmke Innovation Group LLC; James M. Behmke; James J. Wong

(57) ABSTRACT

In one embodiment, a device in a network receives one or more data units. The device calculates a hash value based on the one or more data units and using a hash function. Ranges of hash values generated by the hash function are assigned to different devices along the path such that any given hash value generated by the hash function is assigned to a predefined number of the devices along the path. The device determines whether the calculated hash value is within the range of hash values assigned to the device. The device stores data derived from the one or more data units, when the device determines that the calculated hash value is within the range of hash values assigned to the device.

18 Claims, 11 Drawing Sheets

(56) References Cited

U.S. PATENT DOCUMENTS

| | | | |
|---|---|---|---|
| 10,015,096 B1* | 7/2018 | Singh | H04L 47/15 |
| 10,069,734 B1* | 9/2018 | Singh | H04L 49/3027 |
| 2004/0240462 A1* | 12/2004 | T V | H04L 51/14 |
| | | | 370/432 |
| 2004/0264380 A1* | 12/2004 | Kalkunte | H04L 45/00 |
| | | | 370/238 |
| 2005/0055334 A1* | 3/2005 | Krishnamurthy | G06F 16/30 |
| 2006/0126625 A1* | 6/2006 | Schollmeier | H04L 29/06 |
| | | | 370/390 |
| 2012/0030293 A1* | 2/2012 | Bobotek | G06Q 10/10 |
| | | | 709/206 |
| 2014/0169183 A1* | 6/2014 | Allan | H04L 43/10 |
| | | | 370/248 |
| 2014/0173129 A1* | 6/2014 | Basso | H04L 45/7453 |
| | | | 709/238 |
| 2015/0163146 A1* | 6/2015 | Zhang | H04L 47/125 |
| | | | 370/238 |
| 2016/0028630 A1* | 1/2016 | Wells | H04L 45/7453 |
| | | | 370/389 |
| 2016/0094456 A1* | 3/2016 | Jain | H04L 41/0813 |
| | | | 370/235 |
| 2016/0197831 A1* | 7/2016 | De Foy | H04L 45/7453 |
| | | | 370/392 |
| 2016/0226773 A1* | 8/2016 | Sundaram | H04L 45/24 |
| 2018/0285427 A1* | 10/2018 | Kaplan | H04L 67/1097 |

OTHER PUBLICATIONS

V. Sekar, A. Gupta, M. K. Reiter, and H. Zhang, "Coordinated sampling sans origin-destination identifiers: algorithms and analysis," in 2010 Second International Conference on COMmunication Systems and NETworks (COMSNETS 2010). IEEE, 2010, pp. 1-10.

C.-W. Chang, G. Huang, B. Lin, and C.-N. Chuah, "Lewisure: Loadbalanced network-wide traffic measurement and monitor placement," IEEE Transactions on Parallel and Distributed Systems, vol. 26, No. 4, pp. 1059-1070, 2015.

R. Gad, M. Kappes, and I. Medina-Bulo, "Monitoring traffic in computer networks with dynamic distributed remote packet capturing," in 2015 IEEE International Conference on Communications (ICC). IEEE, 2015, pp. 5759-5764.

A. Di Pietro, F. Huici, D. Costantini, and S. Niccolini, "Decon: Decentralized coordination for large-scale flow monitoring," in INFOCOM IEEE Conference on Computer Communications Workshops, 2010. IEEE, 2010, pp. 1-5.

S.-H. Sheri and A. Akella, "Decor: a distributed coordinated resource monitoring system," in Proceedings of the 2012 IEEE 20th International Workshop on Quality of Service. IEEE Press, 2012, p. 28.

N. Kamiyama, T. Mori, and R. Kawahara, "Autonomic load balancing of flow monitors," Computer Networks, vol. 57, No. 3, pp. 741-761, 2013.

* cited by examiner

DISTRIBUTED COORDINATION OF CACHING AND PROCESSING BY NETWORKING DEVICES

TECHNICAL FIELD

The present disclosure relates generally to computer networks, and, more particularly, to the distributed coordination of caching and processing by networking devices.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

A defining characteristic of many IoT nodes is their constrained nature in terms of computational resources. Notably, IoT nodes typically differ from traditional computing devices in that they often have very limited processing power, memory, computational speed and bandwidth, and power (e.g., a battery-powered sensor). In some cases, computations associated with IoT nodes may be offloaded to remote data centers and/or cloud-based services. For example, a sensor reading may be sent to a remote monitoring service for analysis via the Internet. However, as would be appreciated, doing so also increases the overall overhead of the network, as it requires communications back and forth between the analysis server/service and the endpoint node. Thus, recent efforts have been made to move these computations away from the cloud and into the "fog," e.g., into the nodes/devices in or at the edge of the local network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
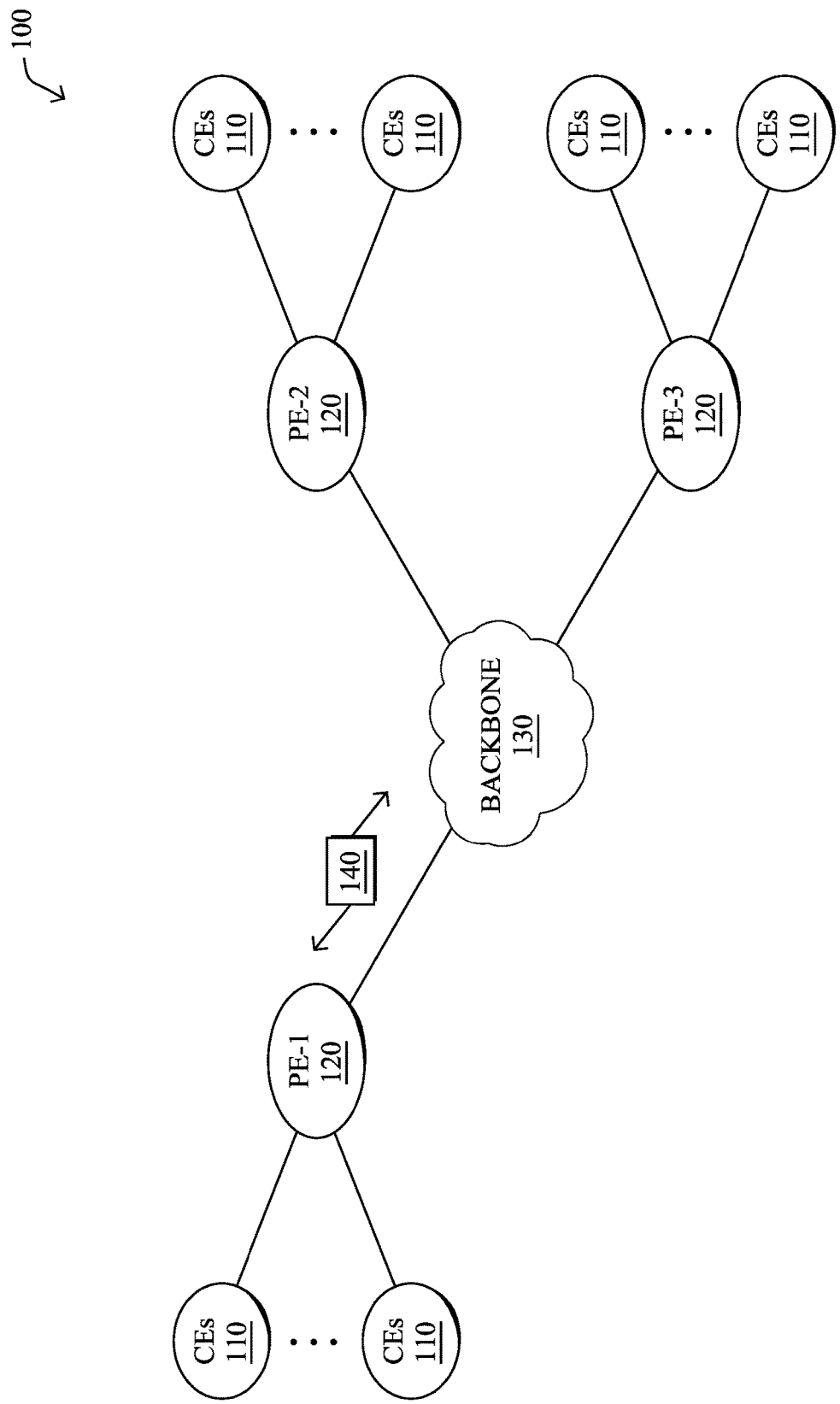
FIGS. 1A-1B illustrate an example communication network.

According to one or more embodiments of the disclosure, a device in a network receives one or more data units. The device calculates a hash value based on the one or more data units and using a hash function. Ranges of hash values generated by the hash function are assigned to different devices along the path such that any given hash value generated by the hash function is assigned to a predefined number of the devices along the path. The device determines whether the calculated hash value is within the range of hash values assigned to the device. The device stores data derived from the one or more data units, when the device determines that the calculated hash value is within the range of hash values assigned to the device.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
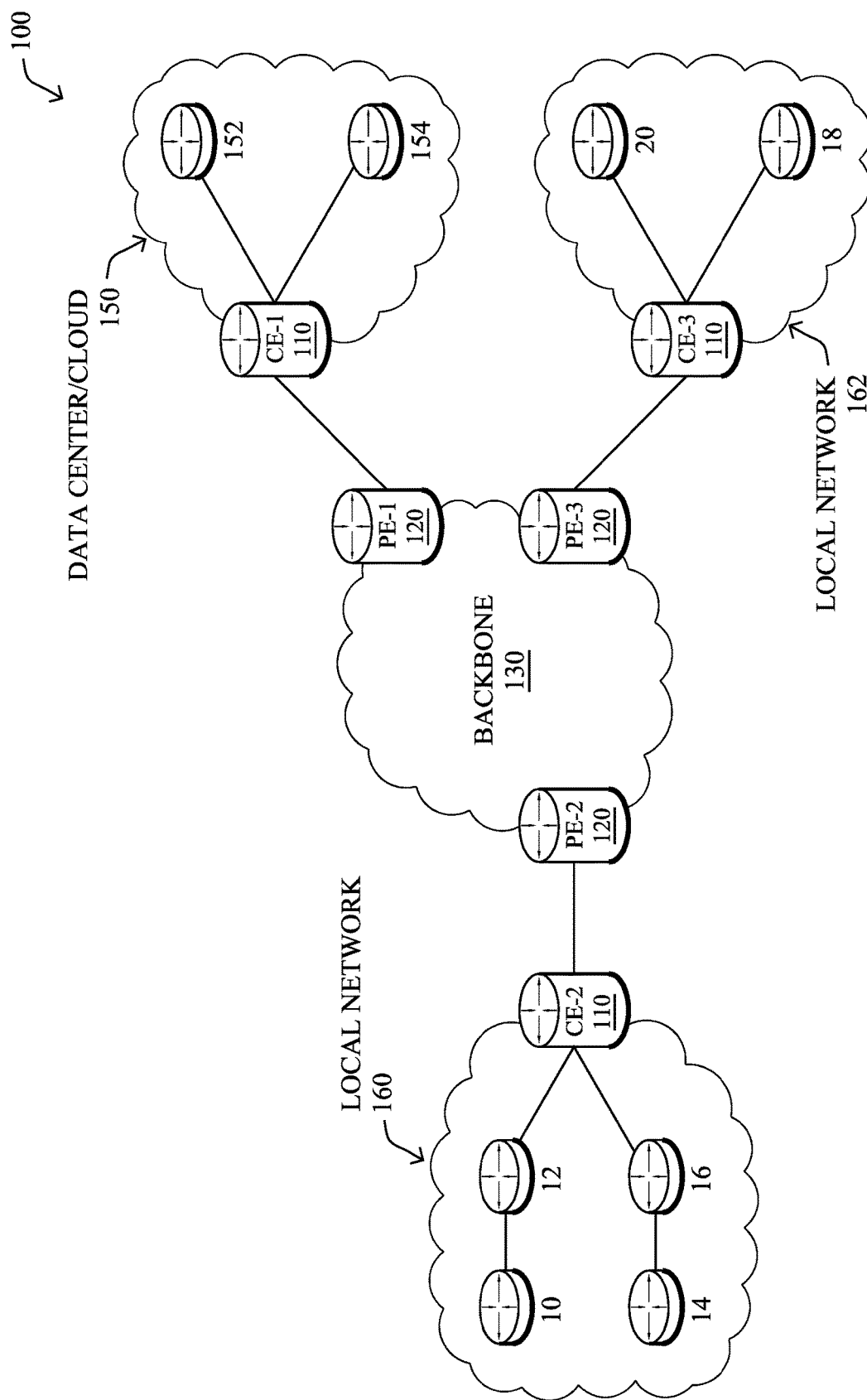

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers.

In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
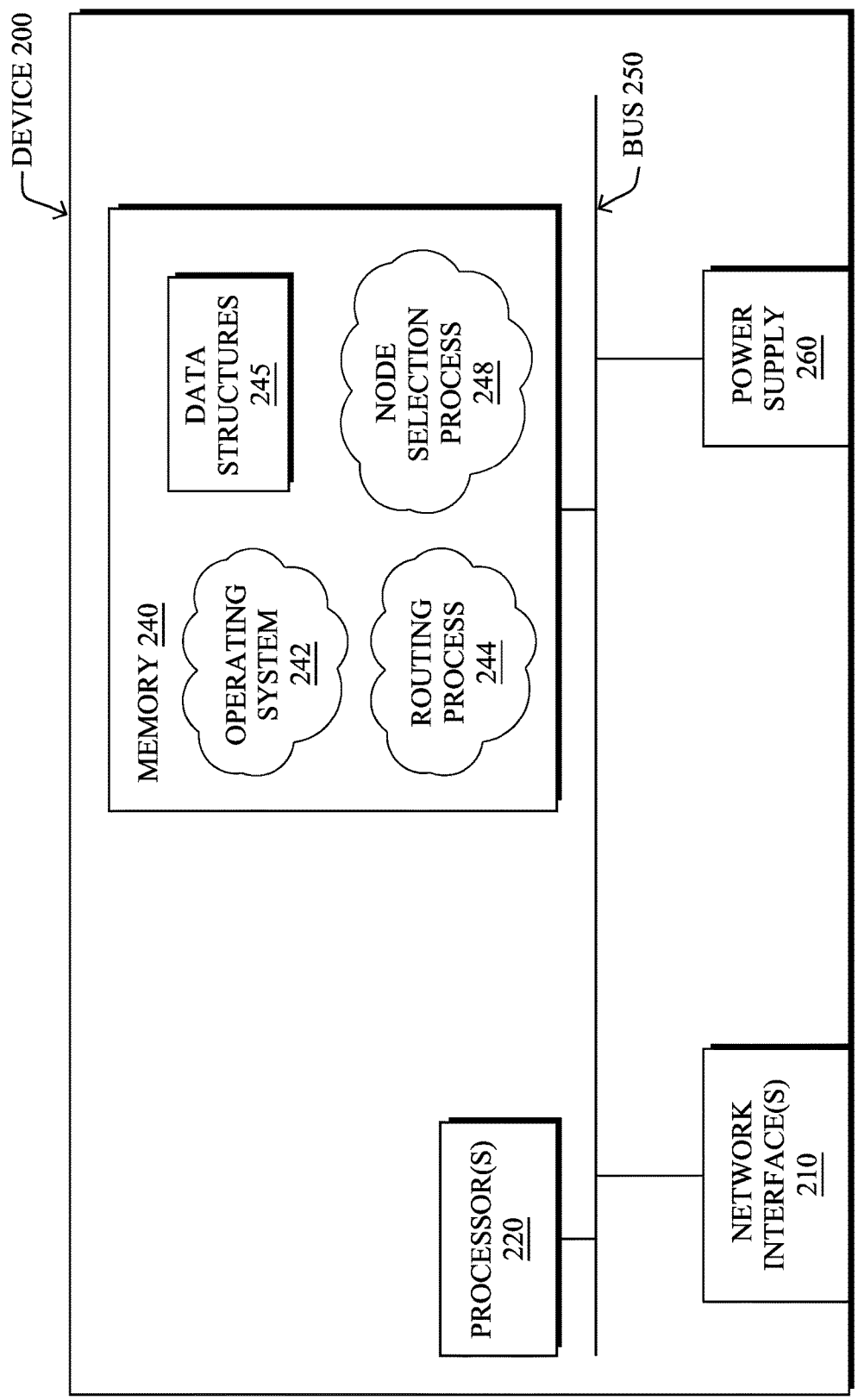
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter ilia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

In the case of LLNs, routing process 244 may support protocols such as the Routing Protocol for Low Power and Lossy Networks (RPL). Generally, RPL provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may be described as a distance vector routing protocol that builds a Directed Acyclic Graph (DAG) for use in routing traffic/packets, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

As noted above, fog computing is gaining increasing momentum and deployment popularity. Notably, fog computing devices (e.g., routers, intelligent switches, other networking equipment, etc.) offer the potential of processing and/or temporarily storing data flowing through the network close to their source, so that only pre-processed, aggregated information is transferred all the way through the network to datacenters or cloud applications. This can bring significant benefits in terms of reducing the amount of data overall traveling through the network and reducing the time to react based on data generated by devices at the network edge. However, each fog device also typically has limited resources, such as processing and storage capacity.

Data center switches also offer the possibility of running custom code within a container, allowing the application logic to be distributed closer to the data on which they operate. Multiple types of network devices also have the capability of forwarding a copy of packets, computing statistics, and possibly capturing traffic. In other words, fog computing allows distributed networking devices the ability to not simply deliver traffic, but to also perform additional operations on the traffic, such as caching and application computations. However, regardless of the specific fog computing implementation, activating such functionality in multiple devices will result in packets being copied/counted/captured multiple times.

Distributed Coordination of Caching and Processing by Networking Devices

The techniques herein allow the processing of a stream of data to be distributed evenly across multiple devices/nodes. In some aspects, the various devices/nodes may agree independently on which set of one or more devices are to process the data (e.g., network traffic) such that n-number of devices/nodes perform the processing. In another aspect, the devices can also temporarily store their allocation portion of the data, possibly allowing them to create a distributed index that enables network-based retrieval of the data at a later time.

Specifically, according to one or more embodiments of the disclosure as described in detail below, a device in a network receives one or more data units. The device calculates a hash value based on the one or more data units and using a hash function. Ranges of hash values generated by the hash function are assigned to different devices along the path such that any given hash value generated by the hash function is assigned to a predefined number of the devices along the path. The device determines whether the calculated hash value is within the range of hash values assigned to the device. The device stores data derived from the one or more data units, when the device determines that the calculated hash value is within the range of hash values assigned to the device.

Illustratively, the techniques described herein may be performed by hardware, software, and/or firmware, such as in accordance with the node selection process 248, which may include computer executable instructions executed by the processor 220 (or independent processor of interfaces 210) to perform functions relating to the techniques described herein, e.g., in conjunction with routing process 244.

Operationally, the techniques herein apply to a network of devices/nodes that forward data (e.g., network traffic packets) from sources to their destination. One example of this is a computer network where the nodes are IP routers and the data comprises IP packets. Another example is an LLN or IoT infrastructure whereby the devices/nodes are microservices or agents interconnected by brokers that aggregate or otherwise process sensor data.

In various embodiments, the techniques herein allow a set of independent nodes to coordinate and ensure that all the information flowing through them is processed by exactly one node or a predefined number of the nodes. The assignment algorithm introduced herein (e.g., implemented as node selection process 248) enables each node to autonomously (e.g., without negotiating their assignment with other nodes) determine the subset of network traffic for which it is responsible. This selection process uses information collected by each node in support of their regular forwarding operation to achieve implicit coordination among nodes.

In particular, based on a shared view of the network, each node may make its selection in such a way that ensures that subsets of different nodes are mutually exclusive and that the union of all subsets includes the whole data traffic. For example, in a computer network, the node selection may leverage information collected by the routing protocols, such as OSPF and IS-IS. In case a routing protocol building a shared view of the network is not being used (e.g., because a distance vector protocol or routing tables are provided in a different way, such as by a controller), the general approach can still be deployed by having the nodes employ a special purpose protocol to create such a shared network view. Thus, in some embodiments, the controller may determine the hash ranges for the nodes. However, such deployment involves communication overhead, while when routing protocols such as OSPF or IS-IS are being used, no additional, dedicated communication is needed. As described in greater detail below, when a node forwards a packet, it may use a hash-based node selection mechanism, to determine whether the packet belongs to its subset of traffic (e.g., whether the node should cache or otherwise perform additional processing of the packet beyond simply communicating the packet to another node).

Figure 3A:
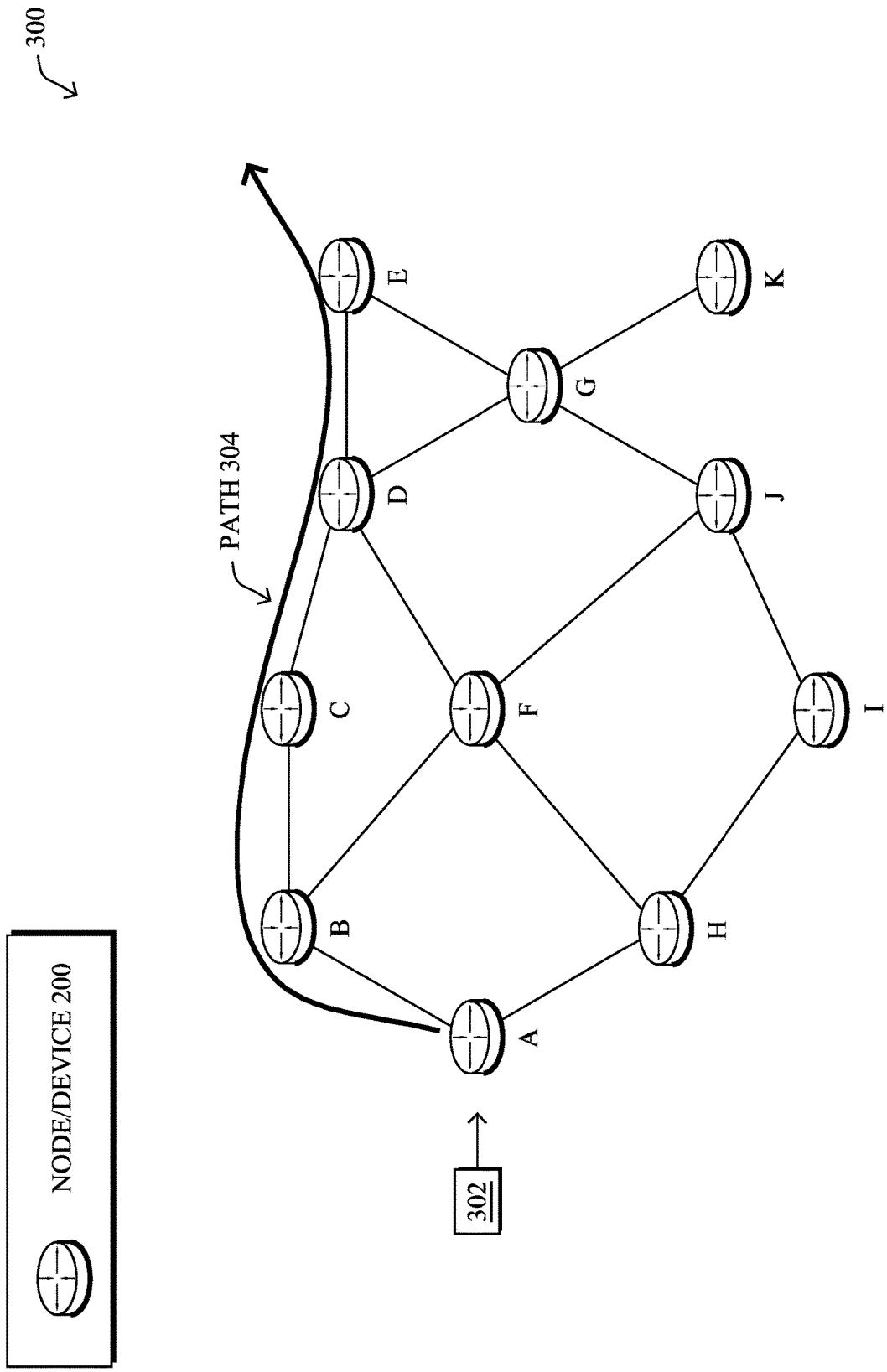
FIGS. 3A-3B illustrate an example portion of a network.
Figure 3B:
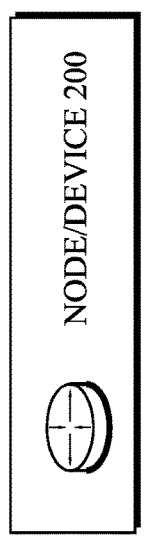
Figure 3B:
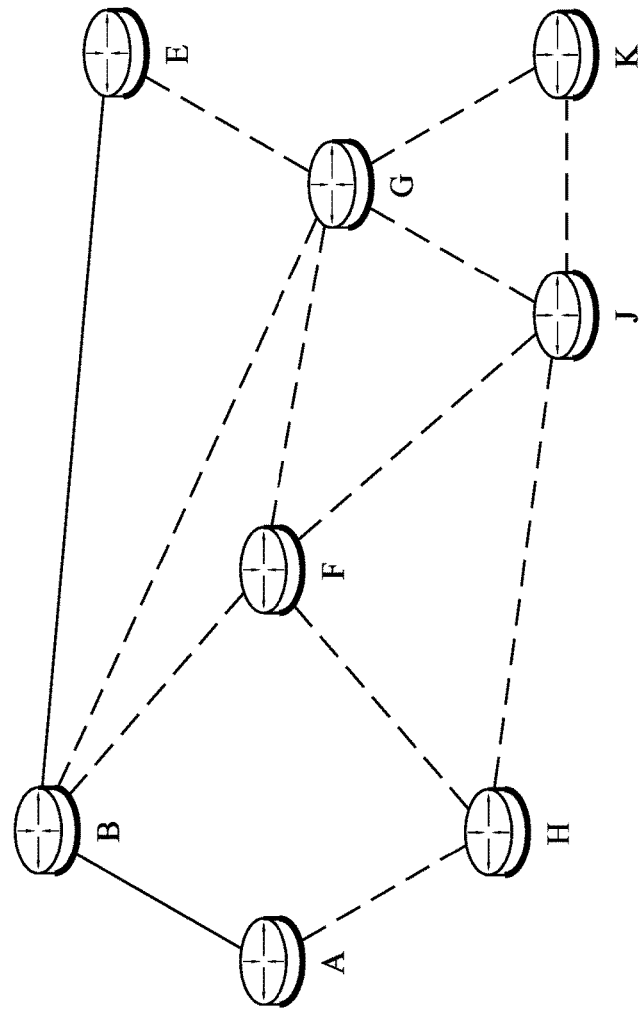

FIGS. 3A-3B illustrate an example portion of a network, according to various embodiments. In various embodiments, the techniques herein do not require all nodes in a portion of the network to participate in the distributed coordination and processing. For example, as shown in FIG. 3A, consider the network portion 300, also referred to herein as a "domain" within the network. In particular, network portion 300 may comprise a set of nodes/devices 200 (e.g., nodes/devices 'A' through 'K') configured to send traffic between an ingress and egress device/node. For example, consider the case of packet/traffic 302 that is to ingress network portion 300 via node A and egress via node E. In such a case, packet/traffic 302 may be sent via a path 304 that comprises nodes A-E, depending on the individual links between the nodes/devices 200, information regarding the state of network portion 300 (e.g., as conveyed by routing protocol signaling, etc.), and other such information.

Not every node/device 200 in network portion 300 may participate in the distributed coordination and processing of network traffic data, in various embodiments. For example, as shown in FIG. 3B, assume that only nodes A, B, E-H, J, and K are configured to do so. In effect, such nodes and their interconnections may form a processing overlay 306. The other nodes in network portion 300 (e.g., nodes C-D and I) may not participate in the additional processing and may instead be limited to only transmitting the traffic data on to other nodes/devices. In doing so, the techniques herein can be deployed in an incremental way, not requiring every node/device along a routing path to support the techniques herein and allowing the capabilities of the infrastructure to be scaled up as the network portion becomes larger or the participating nodes become denser.

Note that while overlay 306 may be used for coordination and the nodes shown in FIG. 3B may perform additional processing/computation on the traffic data (e.g., capture, process and store packets in the context of a computer network), the data plane is unchanged with packets actually being forwarded according to the physical topology illustrated in FIG. 3A. For example, the path in overlay 306 may comprise nodes A, B, and E, but the physical routing may occur along path 304 illustrated in FIG. 3A.

During operation of overlay 306, the constituent nodes may leverage topological knowledge to distribute traffic acquisitions among themselves. The nodes may gain such topology information using existing information (e.g., the routing information base if they operate as regular IP routers, other information conveyed via the routing protocol in use, etc.) or by exchanging ad-hoc messages. Starting from this knowledge, participating nodes infer the path of packets through overlay 306, on which assignment to each node depends. Participating nodes may discover overlay 306 (e.g., which of the other nodes in network portion 300 support the additional caching and/or processing), either by adding this information to existing discovery protocols (e.g., routing protocols, etc.) or by ad-hoc messages. Through this mechanism they also share pertinent information, such as their capabilities and constraints, throughout their operation, to adapt to variable traffic conditions.

Figure 4A:
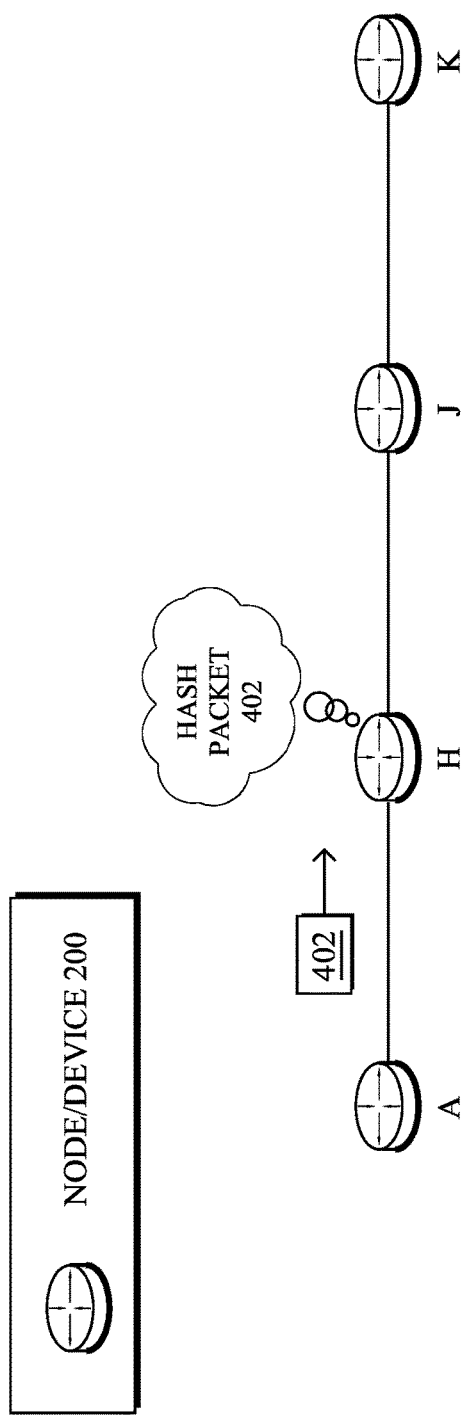
FIGS. 4A-4B illustrate an example of distributed and coordinated caching among network devices/nodes.
Figure 4B:
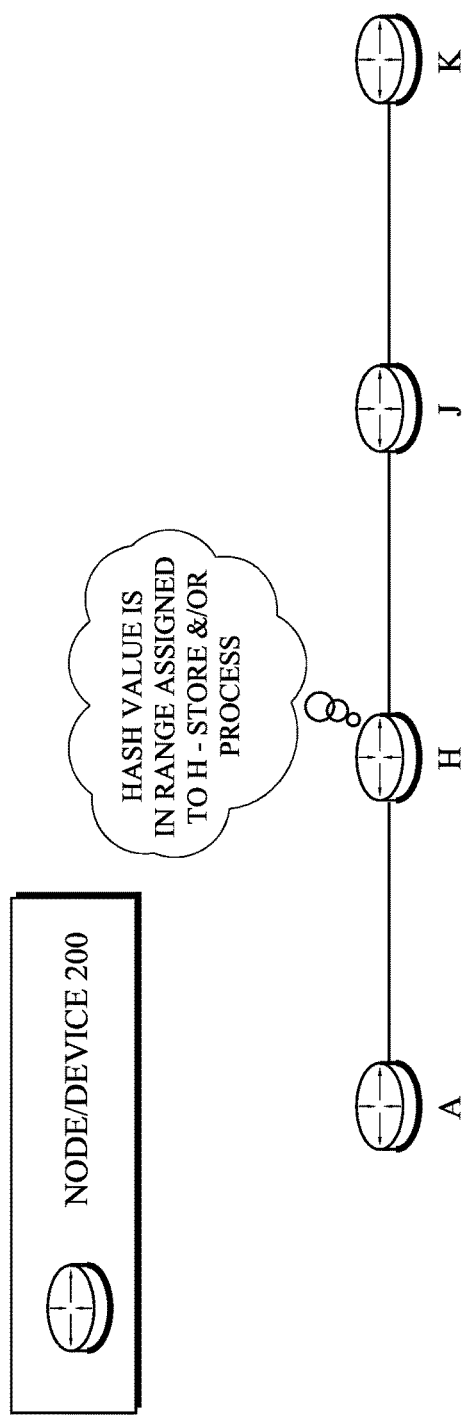

FIGS. 4A-4B illustrate an example of distributed and coordinated caching among network devices/nodes, according to various embodiments. As shown, consider the case in which a packet 402 ingresses network portion 300 shown in FIG. 3A and is to egress network portion 300 via node K. Accordingly, packet 402 may be forwarded along a path that comprises nodes A, H, I, J, K. While node I is still part of this forwarding path, assume that it is not part of overlay 306 shown in FIG. 3B, meaning that it only performs forwarding and not additional operations such as caching or computing a computation based on packet 402.

During their forwarding operation, the overlay nodes shown in FIG. 4A may compute an N bit hash H(k) on a subset k (hash key) of each data unit they forward (e.g., packet 402, a group of packets, etc.) and perform the additional operation(s) only if the hash falls within a specific range determined through the node selection algorithm (e.g., by executing process 248). For example, as shown, node H may hash packet 402 by applying H(k) to packet 402. In turn, as shown in FIG. 4B, node H may determine whether the resulting hash value is within the range of hash values assigned to node H. If so, node H may perform the additional operations on packet 402, such as caching packet 402, performing a computation using the data from packet 402 and storing the result, or any other non-forwarding operation that may be possible in a fog computing environment.

In various embodiments, the hash ranges assigned to individual nodes in an overlay may differ, depending on the path in the network portion via which the data unit is traveling. Generally, the larger the number of overlay nodes through which a flow of traffic data travels, the smaller the number of data units each of those node needs to process. Moreover, the hash range in each node might be affected by policies and available resources (e.g., in the node itself and/or in other nodes on the path of the packets). Specifically, a participating node in an overlay may determine its hash range as follows, according to various embodiments:

1. All possible Ingress-Egress (IE) pairs in the domain are determined starting from topological information available to the node, e.g., through routing protocols. For example, in a computer network such information is available when a routing protocol based on the link state algorithm is deployed, such as OSPF and IS-IS, as it is common on modern sizable networks.
2. For each IE-pair, the forwarding path from ingress node to egress node is computed. It is worth noting that, in a computer network deploying a link state routing protocol, because of the operating principle of the shortest path algorithm, a packet that is forwarded to its destination through an IE-pair follows the same route as packets coming from the ingress node and addressed to the egress node.
3. If the node is associated with an IE-pair (e.g., the node is included in the forwarding path of data flowing from the ingress to the egress nodes of the domain), it computes the hash range for data units on that path by executing an assignment function (e.g., node selection process 248) that, in addition to the number of nodes on the path, takes as parameters policies, resource availability, and/or other constraints regarding the node itself or other nodes.

The outcome of the assignment is referred to herein as a manifest. For example, such a manifest may be a table that assigns to each IE-pair associated to the node a hash range used to identify the packets forwarded on that path that the node is responsible for processing. Coherence among the manifests in all nodes associated to an IE-pair (namely, associations that avoid redundant processing as well as missing some data units) is ensured by the fact that all nodes on an IE-pair run the assignment function with identical input parameters (other than the specific position of the node in the path).

In some embodiments, if a certain degree of redundancy n must be ensured in the processing of data units transiting through an IE-pair, the assignment function ensures that any hash H(k) falls within the hash range of exactly n nodes associated to the IE-pair. Because the hash computed must be the same across all the nodes associated to an IE-pair, the portion of the data unit k used as hash key must not change along the path. Further, to achieve a balanced distribution of packets across different hash ranges (e.g., across different network nodes), the hash key may include high entropy, path-invariant fields of the L3/L4 headers and all the bytes of the packet payload, while excluding fields that might be modified on a hop-by-hop basis and fields that frequently have the same value in different packets.

A participating node, such as node H shown in FIGS. 4A-4B, may identify the IE-pair for each data unit being forwarded through node H, to look up in the manifest the corresponding hash range and compare it with the hash of the data unit. For example, the IE-pair for packet 402 may be {A, K}, which may have its own hash range(s) associated with the nodes of the corresponding path.

Notably, in an IP network deploying a link state routing protocol in the portion of the network, given the destination IP address the node can devise the path the packet will take from itself to the edge of the domain, thus identifying the egress node. In other contexts, a mechanism to devise the egress node for a data unit can be made available through ad hoc messaging or another such mechanism. On the other hand, the ingress node through which a packet enters the portion of the network can be inferred by considering the egress node of the reverse path (e.g., the path from egress node to source), if routing in that portion of the network is symmetrical. For example, in an IP network:

If the ingress node does not correspond to the egress node of the reverse path, starting from the egress node (i.e., routing is not symmetrical within the portion of the network), the ingress node must provide its identity to internal nodes by marking the packet with a unique ingress ID.

If a packet is received without an Ingress ID, internal nodes that conclude that routing is symmetrical compute the reverse path and the last hop in the domain is assumed to be the ingress node of the packet.

Hence, in an IP network for every packet received from a router outside the domain, an ingress node may perform any or all of the following:

1. compute the egress node based on its routing information and the destination IP address,
2. compute the path of a packet in the reverse direction (e.g., from the egress node to the source IP address), and
3. mark the packet with its own Ingress ID, if it is not the last hop on such a path.

In various embodiments, the following pseudocode illustrates the potential operation of a node in an overlay:

Require: Node_ID and Manifest
p ← new data unit
path ← COMPUTE_PATH(Node_ID → p[dst])
EID ← EGRESS_NODE(path)
if p is from outside the portion of the network then
    r_path ← COMPUTE_PATH(EID → p[src])
    if EGRESS_NODE(r_path) ≠ Node_ID then
        p[IID] ← Node_ID /* IID is the ID of the Ingress*/

-continued

```
        end if
    end if
    if p contains IID then
        IID ← p[IID]
    else
            r_path ← COMPUTE_PATH(EID → p[src])
            IID ← EGRESS_NODE(r_path)
    end if
    key ← EXTRACT_KEY(p)
    if HASH(key) ∈ Manifest[IID][EID] then
        Process(p)
    end if
```

In an IP network, packet marking can leverage unused fields in the IP header (e.g., IP identification field, DS field), network specific fields (e.g., MPLS labels) or tunneling techniques (e.g., GRE). Given how routing is commonly configured and operated in today's networks, it is reasonable that packet marking is rarely needed.

In various embodiments, the additional processing of a packet by a node may include caching data derived from the packet/data unit (e.g., the communicated data or results of performing a computation with the communicated data). In such cases, the nodes in the overlay may create a distributed index that enables retrieval of the stored data at a later time. For example, each node may keep an index that associates each saved data unit with a key, made of a set of relevant properties extracted from the data unit itself.

To provide remote access to the index, the node may implement a query engine that can perform a lookup in the node's local index to extract a subset of entries satisfying the requested properties. An external entity can send in parallel a query to all the nodes in the domain to perform a distributed lookup in the index. Each node may reply with the subsets of entries in its index that satisfy the query, thus all the entries received by the nodes can be aggregated to obtain a unique report for the entire network.

The distributed index can also be queried through a single node acting as a proxy. This node receives the query and forwards it to all the other nodes in the overlay. The responses of the distributed query are received by the proxy, which aggregates them and sends back the complete report.

Additionally, if the same subset of the data unit (e.g., the same protocol fields in the case of a packet) is used as index key and hash key, the manifests can be used to perform exact match queries (e.g., queries where a value for all the fields of the key is provided) without sending a request to all the nodes. In principle, if the IE pair through which queried data units have entered and exited the domain is known, comparing the hash of the query parameters with the manifests of the nodes associated to the IE pair, would identify the node(s responsible for processing (and possibly storing) the data unit. However, since the IE pair that handled the queried data units may not be known, the manifests may be used to reduce the set of nodes that could have processed the requested data units. Comparing the hash of the query parameters with all the manifests used in the domain, multiple manifests might match for different IE pairs. Moreover, since the manifest can change over time, it is possible that multiple manifests corresponding to different periods match a request. Accordingly, a node may save the capturing timestamp and, if the query includes a time interval, it can be used to limit the scope of the hash matching.

In some cases, the techniques herein may require a centralized entity to store all the manifests and keep each manifest as long as there is a corresponding data unit cached in the network portion. To avoid a centralized store for the manifests, they can be saved in a distributed way, such as a distributed hash table (DHT), to perform decentralized exact match queries. If a DHT is used, it may be implemented by dividing the indexing hash space among the nodes. Each node is then responsible for a subset of the hash space (hash range) and saves the location of all the data units with a key k such that H(k) falls within its own hash range.

A node may also update the DHT for each IE pair to which it is associated by sending a message to each assigned node that identifies a indexing hash range that partially overlaps the hash range in the manifest. This message may include the ID of the sender and the intersection of the two hash ranges. The node that receives the message saves the association between the sender ID and the processing hash range in the message (which is a subset of its indexing hash range). Each processing hash range in the DHT can be associated with multiple nodes, since the same hash can be part of the processing hash ranges of different nodes for different IE pairs or the node in charge of a processing hash range can change over time.

By way of example, assume that a data unit has a key k and its hash H(k) falls within: 1.) the indexing hash range $H_i$ of the node A and 2.) the processing hash range $H_H$ and $H_J$ of nodes H and J shown in FIG. 4A-4B (specifically, the hash range that the manifests of node H and J associated with the IE pair for A and K). In this case, node A will keep the associations:

intersection between $H_i$ and $H_H$→node H;
intersection between H_i and $H_J$→node J;

The process to retrieve the data unit with key k is then as follows:

1. compute the hash H(k),
2. identify the node responsible for the subset of the indexing hash space $H_i$ containing H(k) (e.g., node A),
3. query the node for the possible locations of the data unit (e.g., nodes H and J), and
4. retrieve the data unit from the nodes H and J.

In one possible implementation, CRC32 can be used as a hashing function. In this case, the hash space that is being divided among the nodes on a path is between 0 and $2^{32}-1$. During prototyping, the hashing key was based on the 5-tuple (source IP address, destination IP address, Protocol, transport source port, transport destination port) of the packet, which has the effect of having packets belonging to the same flow hashed to the same value, hence processed by the same network node. This is a key requirement when the processing performed by the nodes requires visibility on a whole flow or when per-flow storage and indexing is deployed. In other experiments, the whole packet, excluding fields that may change along the path, was used as a hash key to ensure that packets belonging to the same flow are processed by different nodes. This is important when security of the captured and processed data is a concern because no node handles (and possibly stores) all packets exchanged as part of flow.

The specific type of hash function that can be used may vary, in further embodiments, and other hash functions can be used as desired. For example, MD5 hashing could also be used, in another implementation. However, the specific choice of hash function could also possibly affect performance, such as if the hash function does not uniformly spread the space of key values to the hash space. The choice of the specific hash key (e.g., which information within each packet is used to determine whether packets should be processed by the same node or not) has an impact on how packets are distributed for processing on different nodes.

Consequently, the choice of the packet portion to use as a hashing key is dependent on the specific application being implemented and its constraint (such as enhanced security and privacy).

As a further consideration, topology changes in the network are also to be expected. When there is a change in the network topology, routes are updated as some paths might not be any longer valid or new shorter paths might have become available. As a result, after this process packets might follow different paths. For example, when a link state protocol, such as OSPF or ISIS, is being used, the node(s) that detect the topology change generate a new link state that is propagated to all other nodes. As network nodes receive the new link state, they typically install the new link state in their routing database and re-compute routes as needed (e.g., by updating their routing tables).

In the context of the techniques herein, after the routes are updated (e.g., by process 244), each node may executes its node selection process (e.g., process 248), to re-compute its manifest based on the new paths. After a topology change, there is a transient period (e.g., the time between propagating the new link states and re-computing their routes) during which packets could be lost due to outdated and non-coherent routes. Similarly during this transient period some packets might not be processed by any node or be processed by more than one node.

Figure 5:
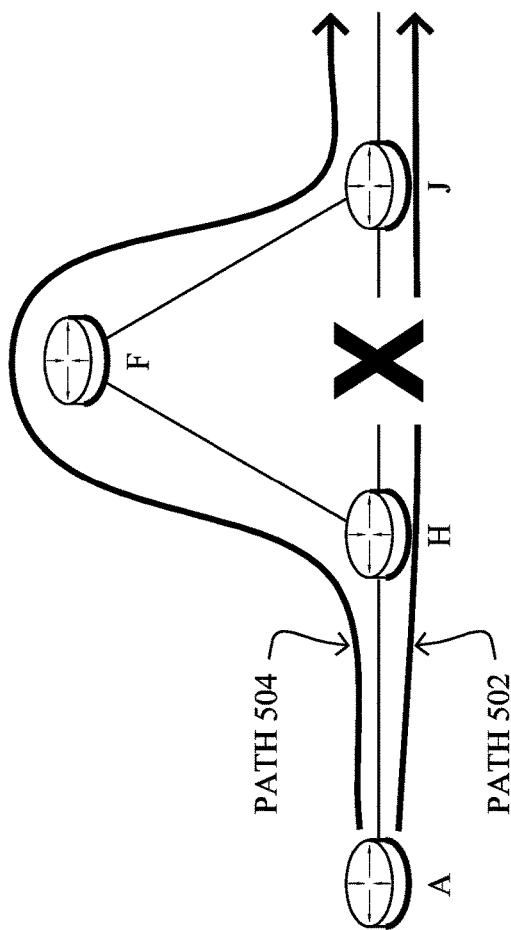
FIG. 5 illustrates an example of a path change in a network.

By way of example and with reference to FIG. 5, consider the path 502 with ingress node A and egress node J that also includes node H as an intermediary node along the path. If there is a link failure along path 502 between nodes H and J, the traffic along path 502 may be rerouted instead along path 504, which also includes intermediate node F, to bypass this link failure. However, during the transient period before the overlay nodes are fully reconfigured to use path 504, node F may not have an entry in its manifest for the IE-pair {A, J}. In some embodiments, the default behavior of an overlay node may be to perform the additional caching and/or processing of any received traffic flows that do not have corresponding manifest entries in the node. Thus, node F may cache or otherwise perform additional computations based on the received traffic along path 504 during the transient period. Doing so ensures that each packet will be cached or otherwise processed by at least one of nodes A, H, J, and F, during the transient period. Once the transient period is over and each of the nodes is aware of the topology and corresponding routing changes, their manifest entries for the IE-pair {A, J} are updated so that each of the nodes along the new path 504 will be responsible for performing additional caching or processing on one fourth of the hash space.

Conversely, if as an example the hash ranges are equally divided among the nodes in a path, once the link between H and J is recovered and traffic resumes flowing on path 502, nodes J (and F) might still consider themselves responsible for one fourth of the hash space during this transient period (e.g., the division of the hash space according to path 504), rather than one third of it (e.g., the division of the hash space according to path 502). Consequently, some of data units that would have been processed by F on the old path 504 for the IE-pair {A, J} are now the responsibility of J and not processed by any of the nodes.

To address the above scenario, the nodes can be configured to temporarily process all the packets that they forward for a short time window after they detect a topological change or receive a topology change notification (e.g., a link state update). This is particularly helpful in use cases where having a limited amount of duplicate processing is preferable to missing at all some of the data units. In general, a topology change should be a relatively rare event in a stable network and convergence quite fast, thus duplicate processing should usually be uncommon.

Equal-Cost Multi-Path routing (ECMP) also presents another potential scenario that the techniques herein can address. Notably, in IP networks, packets can be forwarded towards a single destination over multiple paths using ECMP. When ECMP is deployed, a router can select different next-hops for different packets addressed to the same destination, as long as the downstream paths have the same cost according to the used routing metric. In typical implementations, a router assigns flows to one of the equal-cost paths by hashing flow-related information in the packet header, the hash space having been equally partitioned among the equal-cost paths. As a result, packets of the same flow follow the same path, while multiple flows are distributed over multiple paths.

Since each router using ECMP autonomously assigns hash ranges to equal-cost paths, upstream routers cannot predict which one of the equal-cost paths is chosen by downstream routers. Given that path-awareness is a key aspect of the node selection and coordination for additional processing/caching, multipath routing can be address as follows:

Given a set of alternative equal cost paths across the portion of the network, nodes first compute their hash range considering the path with the smallest number of hops.

Then, nodes that are on a longer path split the hash subrange allocated to all nodes in the corresponding portion of the shortest path.

Figure 6A:
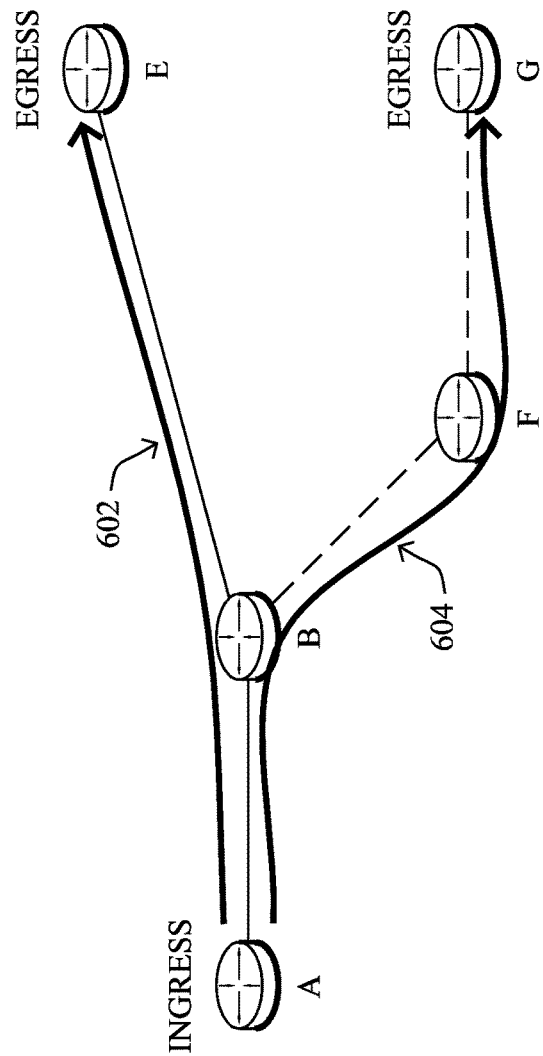
FIGS. 6A-6C illustrate examples of Equal-Cost Multipath (ECMP) paths.
Figure 6B:
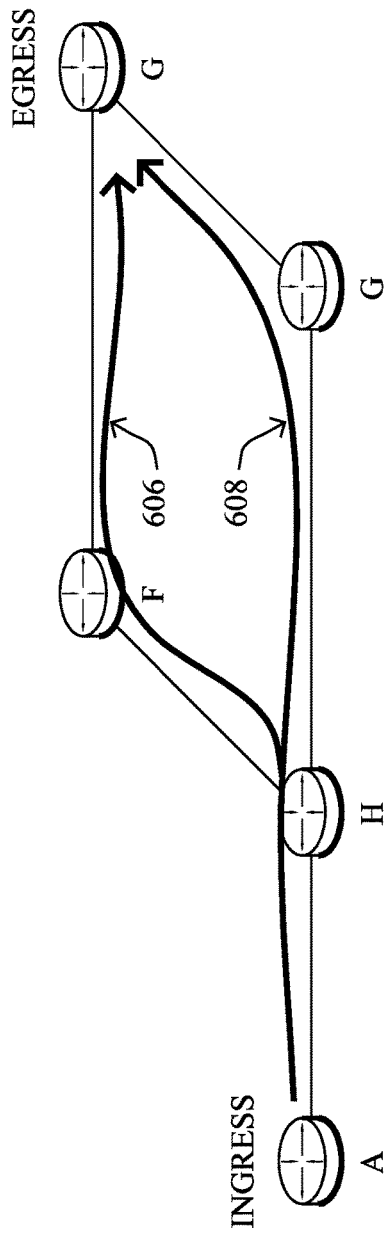
Figure 6B:
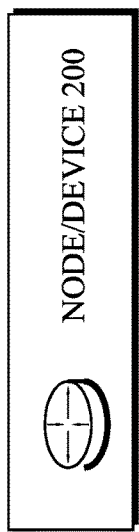
Figure 6C:
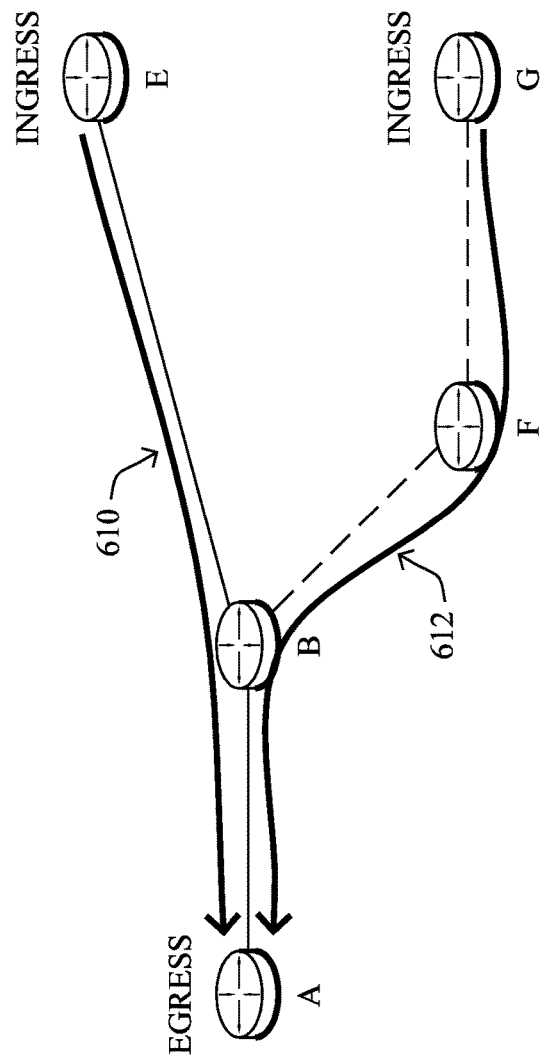

FIGS. 6A-6C illustrate examples of various ECMP paths to which the above approach may be applied. It is also worth noting that this approach does lead to a suboptimal load distribution among the overlay nodes, but ensures non-overlapping hash ranges, to control the additional processing and/or caching by the overlay nodes.

As showed by the example in FIG. 6A, one potential ECMP scenario entails multiple paths from the same ingress node to different egress nodes. Notably, ingress node A may have a first path 602 that traverses node B to egress node E, as well as an equal-cost path 604 to egress node G that traverses nodes B and F. Hence, paths 602 and 604 will be associated with different IE-pairs {A, E} and {A, G}. However, by nature of the multipath process, node A cannot know which of paths 602 and 604 a given packet will follow.

To address the scenario depicted in FIG. 6A, the hash computation nodes may first consider the path with the least resources (e.g., the least number of hops), path 602, when determining the hash range assignments for both IE-pairs. In turn, the range assigned to the subpath of path 602 that includes egress node E may be equally distributed among the nodes of the mutually exclusive subpath of path 604 that includes nodes F and G. The first phase of this range assignment considering path 602 may proceed as follows, with the notation $m_{xy}$ representing the size of the hash range for the path x assigned to the node y. Notably, in the case of nodes with equal resources and constraints, the following may be used:

$$m_{602A} = m_{602B} = m_{604A} = m_{604B} = m_{602E} = 1/3$$

Then, $m_{602E}$ is divided between F and G for the AG IE-pair:

$$m_{604F} = m_{604G} = 1/6$$

Consequently, node A and node B will be assigned ⅓ of the range of hash values, node E will be assigned ⅓ of the range of hash values, and each of nodes F and G will be assigned ⅙ of the range of hash values, thereby ensuring that one of the overlay nodes will always perform the additional caching and/or processing on any given packet.

Another example multipath scenario is depicted in FIG. 6B in which there are multiple paths between an ingress node A and an egress node G via different transit nodes. In particular, there may be two equal-cost paths between A and G: path 606 that includes node F and path 608 that includes node J. Both of paths 606 and 608 may also include node H. In this scenario, the range assignment may proceed in a similar manner as that for FIG. 6A, with the exception that paths 606 and 608 share the same IE-pair {A, G}. For example, path 606 may first be subdivided evenly and then the ranges of hash values assigned to the non-overlapping portions of path 608 may be subdivided accordingly, as follows:

$$m_{604A}=m_{606H}=m_{606F}=m_{606G}=m_{608A}=m_{608H}=m_{608J}=m_{608G}=\tfrac{1}{4}$$

Thus, the nodes will each be assigned ¼ of the hash value range.

FIG. 6C illustrates yet another multipath scenario in which equal-cost paths from different ingress nodes both egress the same node. Notably, path 610 may include ingress node E, transit/intermediate node B, and egress node A. Similarly, path 612 may include ingress node G, transit/intermediate nodes F and B, and egress node A. Applying the two step methodology to the different paths 610 and 612 results in the following:

Similarly to the previous cases, in a first phase A, B and E each assign themselves one third of the hash space:

$$m_{610E}=m_{610B}=m_{610A}=m_{612B}=m_{612A}=\tfrac{1}{3}$$

Then, the range of size $m_{610E}$ is divided between F and G for the IE-pair {G, A} (i.e., the path 612):

$$m_{612G}=m_{612F}=\tfrac{1}{6}$$

In the particular scenario depicted in FIG. 6C, another solution is also possible. In further embodiments, the ingress routers E and G, knowing that two equal cost paths exist, may mark packets with their Ingress ID, even if the paths are symmetric (e.g., downstream nodes could infer the ingress router from the path to the source). This enables downstream routers (including B and A) to know the exact path the packet went through and, consequently, more evenly distribute the hash range. In doing so, the overlay nodes will also more evenly distribute the processing and storage loads among themselves. Specifically, the hash value range can be divided in 3 parts for the IE-pair {E, A} (i.e., path 610) and 4 parts for the IE-pair {G, A} (i.e., path 612):

$$m_{610E}=m_{610B}=m_{610A}=\tfrac{1}{3}$$

$$m_{612G}=m_{612F}=m_{612B}=m_{612A}=\tfrac{1}{4}$$

The approach involving packet marking provides a more balanced load distribution among the nodes, but at the expense of having to mark packets. In some embodiments, the selection between approaches (e.g., marking vs. not marking) may be controlled by a configurable parameter, thereby allowing the end user the option of using either or both approaches, depending on the specific application.

Data stored along a network path using the techniques herein can be retrieved in several ways. In one embodiment, a query may be broadcast to all network nodes for the data. In another embodiment, a distributed index may be used for purposes of information retrieval. For example, such an index may be constructed by forming index keys as the concatenation of the storage time of the data with its hash value or, alternatively, by keeping the index and hash keys distinct. Notably, a node can construct its own index by simply storing its manifest over time and timestamping the data that it stores (e.g., either a cached version of the raw data or data derived therefrom), such as the packet capture time. In turn, a data lookup of the data units with key k may entail locating the manifest associated with time t, identifying the range of hash values within which the hash h(k) falls, and requesting data units (t, k) from the corresponding node. The index can be stored as a whole in a single location, replicated across multiple locations, or distributed across several nodes (e.g., using DHT).

As would be appreciated, the techniques herein allow for each of the overlay nodes to operate autonomously with respect to the node assignment (e.g., the overlay nodes to not need to negotiate their assignments with the other nodes). Instead, rather than using ad hoc communications and specialized protocol messages, the techniques herein leverage existing knowledge about the network available from the routing protocol, to make the node assignments. Of course, in further embodiments, a special purpose communication protocol could also be used to create a shared view of the network, as well.

Note that the techniques herein can also be applied in various deployments where information is transferred across a network of nodes. For example, the techniques herein can be implemented in computer networks where nodes are IP routers, Ethernet switches, MPLS switches, or other types of data switches. Another use case is represented by an IoT infrastructure where sensor data is transferred through a network or nodes or microservices and brokers. Accordingly, the techniques herein may be applied to any device or node that processes received data units, such as packets, frames, messages, sensor readings, etc.

Figure 7:
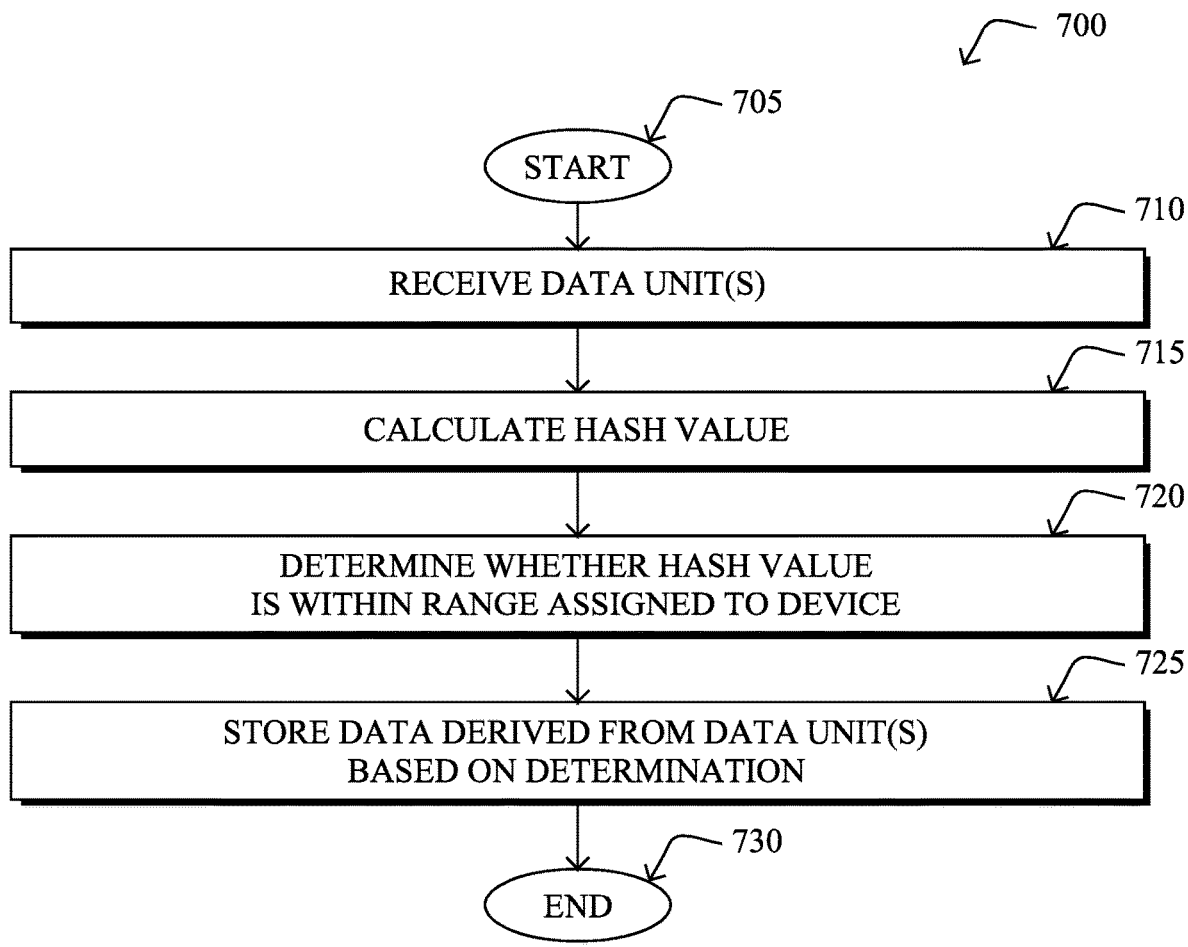
FIG. 7 illustrates an example simplified procedure for storing data derived from network packets in a distributed manner.

FIG. 7 illustrates an example simplified procedure for storing data derived from network packets in a distributed manner, in accordance with one or more embodiments described herein. For example, a non-generic, specifically configured device (e.g., device 200) may perform procedure 700 by executing stored instructions (e.g., process 248). The procedure 700 may start at step 705, and continues to step 710, where, as described in greater detail above, a device/node along a path in a network may receive one or more data units (e.g., one or more packets, frames, information messages, etc.).

At step 715, as detailed above, the device may calculate a hash value based on the one or more received data units. For example, the hash value may be computed by applying a hash function to the 5-tuple of a received packet, or any other information derived therefrom. In various embodiments, ranges of hash values generated by the hash function are assigned to different devices along the path such that any given hash value generated by the hash function is assigned to a predefined number of the devices along the path. For example, the set of hash values generated by the hash function may be subdivided and assigned to the different devices along the path, including the device performing procedure 700, such that any given data unit may fall within the assigned ranges of one, two, three, or any preselected number of the devices.

At step 720, the device may determine whether the hash value computed in step 715 is assigned to the device, as described in greater detail above. For example, assume that the device is one of three overlay devices along the path that are configured to perform additional caching and/or processing of the packets of traffic data that flow via the path. Further, assume that the caching and/or processing is to be distributed across the three devices such that any given packet is cached and/or processed by a single one of the devices. In such a case, the device may be assigned one third of the range of hash values possible from the hash function.

At step 725, as detailed above, the device may store data derived from the one or more data units based on the determination made in step 720. In particular, when the hash value from step 715 is within the range of hash values assigned to the device, the device may determine that the device is to perform additional operations on the one or more data units received by the device. In various embodiments, the device may derive the data for storage either directly from the raw packets (e.g., by storing the payload of the packet, caching the entire packet, etc.) or, in further cases, perform a computation based on the received packet(s) and store the result. For example, consider the case in which a packet carries a temperature reading from a temperature sensor in the network. In such a case, the device may use the temperature reading to perform a computation, such as computing an average temperature for an area over a period of time. In turn, the device may store this average for possible retrieval or reporting. Note further that the storage may be temporary or permanent, depending on the type of data, the capabilities of the processing device, and/or other such factors. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, enable nodes to fairly distribute the processing, and possibly storage, of data units that they forward in the network. In some aspects, the techniques allow for decentralized coordination of this load balancing and without the need of any dedicated communications among the nodes. Instead, information already available to the nodes (e.g., due to their normal operation as information routers) may be used to support coordination in the load distribution. In further aspects, the load distribution can also be adapted to the changing traffic profile, leveraging data shared by all the nodes in a path with no or minimal communication among nodes.

By leveraging processing and storage resources available in network nodes to perform potentially resource-intensive tasks, such tasks can be distributed across multiple nodes in a network. Moreover, such tasks can be performed close to the source of the data on which they operate, which allows the following:

1. If the processing might result in a feedback or control signal to the data source, reaction time is much shorter as it cuts the round trip time to the datacenter/cloud; and
2. If the processing produces some aggregated or filtered results from a large amount of data, only such results can be shipped back to the data center/cloud, without needing to transfer through the network the whole data stream.

While there have been shown and described illustrative embodiments that provide for distributed coordination of caching and processing by network devices, it is to be understood that various other adaptations and modifications may be made within the spirit and scope of the embodiments herein. For example, while certain embodiments are described herein with respect to using certain routing protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    receiving, at a device along a path in a network, one or more data units that are to be forwarded by the device along the path;
    identifying, by the device, an ingress and egress of the path by analyzing the one or more data units;
    calculating, by the device, a hash value based on the one or more data units and using a hash function, wherein ranges of hash values generated by the hash function are assigned to different devices along the path a) based on the identified ingress and egress of the path and b) such that any given hash value generated by the hash function is assigned to a predefined number of the devices along the path;
    determining, by the device, whether the calculated hash value is within a range of hash values assigned to the device; and
    storing, by the device and in addition to forwarding the one or more data units along the path, data derived from the one or more data units, when the device determines that the calculated hash value is within the range of hash values assigned to the device.

2. The method as in claim 1, wherein the data derived from the one or more data units comprise data copied from the one or more data units.

3. The method as in claim 1, further comprising:
    performing, by the device, a computation based on the one or more data units, when the device determines that the calculated hash value is within the range of hash values assigned to the device, wherein the stored data derived from the one or more data units comprises an output of the computation.

4. The method as in claim 1, further comprising:
    adjusting, by the device, the ranges of hash values assigned to the different devices along the path, in response to determining that a routing change to the path has occurred.

5. The method as in claim 1, further comprising:
    maintaining, by the device, an index value associated with the stored data derived from the one or more data units;
    retrieving, by the device, the stored data derived from the one or more data units using the index value and in response to a query from a remote device; and
    providing, by the device, the stored data to the remote device.

6. The method as in claim 5, further comprising:
receiving, at the device, the query from the remote device, wherein the index value is based on the calculated hash value, and wherein the query comprises the index value.

7. The method as in claim 1, wherein the path is a first path in a set of equal-cost multi-path (ECMP) paths with different egresses, and wherein a range of hash values assigned to one or more devices along the first path that do not overlap a second ECMP path in the set are apportioned and assigned to one or more devices along the second ECMP path and are not in the first path.

8. The method as in claim 1, wherein the path is a first path in a set of equal-cost multi-path (ECMP) paths with different intermediate devices, and wherein a range of hash values assigned to one or more intermediate devices along the first path that do not overlap a second ECMP path in the set are apportioned and assigned to one or more intermediate devices along the second ECMP path and are not in the first path.

9. The method as in claim 1, wherein the path is a first path in a set of equal-cost multi-path (ECMP) paths with different ingress devices, and wherein a range of hash values assigned to the ingress along the first path is apportioned and assigned to a set of one or more devices along a second ECMP path in the set of ECMP paths, wherein the set of one or more devices along the second ECMP path comprises one or more devices that are not along the first path.

10. An apparatus, comprising:
one or more network interfaces to communicate with a network;
a processor coupled to the network interfaces and configured to execute one or more processes; and
a memory configured to store a process executable by the processor, the process when executed configured to:
receive one or more data units that are to be forwarded by the apparatus along a path in the network;
identify an ingress and egress of the path by analyzing the one or more data units;
calculate a hash value based on the one or more data units and using a hash function, wherein ranges of hash values generated by the hash function are assigned to different devices along the path a) based on the identified ingress and egress of the path and b) such that any given hash value generated by the hash function is assigned to a predefined number of the devices along the path;
determine whether the calculated hash value is within a range of hash values assigned to the apparatus; and
store, in addition to forwarding the one or more units along the path, data derived from the one or more data units, when the apparatus determines that the calculated hash value is within the range of hash values assigned to the apparatus.

11. The apparatus as in claim 10, wherein the data derived from the one or more data units comprise data copied from the one or more data units.

12. The apparatus as in claim 10, wherein the process when executed is further configured to:
perform a computation based on the one or more data units, when the apparatus determines that the calculated hash value is within the range of hash values assigned to the apparatus, wherein the stored data derived from the one or more data units comprises an output of the computation.

13. The apparatus as in claim 10, wherein the process when executed is further configured to:
adjust the ranges of hash values assigned to the different devices along the path, in response to determining that a routing change to the path has occurred.

14. The apparatus as in claim 10, wherein the ranges of hash values assigned to the different devices along the path are based on routing information in the network.

15. The apparatus as in claim 10, wherein the process when executed is further configured to:
maintain an index value associated with the stored data derived from the one or more data units;
retrieve the stored data derived from the one or more data units using the index value and in response to a query from a remote device; and
provide the stored data to the remote device.

16. The apparatus as in claim 15, wherein the process when executed is further configured to:
receive the query from the remote device, wherein the index value is based on the calculated hash value, and wherein the query comprises the index value.

17. The apparatus as in claim 10, wherein the process when executed is further configured to:
apportion a range of hash values assigned to a particular device along the path to one or more other devices along another path in the network.

18. A tangible, non-transitory, computer-readable media having software encoded thereon, the software when executed by a device along a path in a network cause the device to perform a process comprising:
receiving, at the device, one or more data units that are to be forwarded by the device along the path;
identifying, by the device, an ingress and egress of the path by analyzing the one or more data units;
calculating, by the device, a hash value based on the one or more data units and using a hash function, wherein ranges of hash values generated by the hash function are assigned to different devices along the path a) based on the identified ingress and egress of the path and b) such that any given hash value generated by the hash function is assigned to a predefined number of the devices along the path;
determining, by the device, whether the calculated hash value is within a range of hash values assigned to the device; and
storing, by the device and in addition to forwarding the one or more data units along the path, data derived from the one or more data units, when the device determines that the calculated hash value is within the range of hash values assigned to the device.

* * * * *

UNITED STATES PATENT AND TRADEMARK OFFICE
CERTIFICATE OF CORRECTION

PATENT NO. : 10,642,739 B2
APPLICATION NO. : 15/700453
DATED : May 5, 2020
INVENTOR(S) : Mario Baldi et al.

Page 1 of 1

It is certified that error appears in the above-identified patent and that said Letters Patent is hereby corrected as shown below:

In the Specification

Column 5, Line 43, amend as shown:
node by, inter ailia, invoking network operations in support of Column 11, Line 53, amend as shown:
node(s) responsible for processing (and possibly storing) the Column 13, Line 24, amend as shown:
coherent routes. Similarly, during this transient period some Column 16, Line 42, amend as shown:
700 by executing stored instructions (e.g., process 248). The Signed and Sealed this
Twenty-ninth Day of September, 2020

Andrei Iancu
*Director of the United States Patent and Trademark Office*